UNITED STATES PATENT OFFICE.

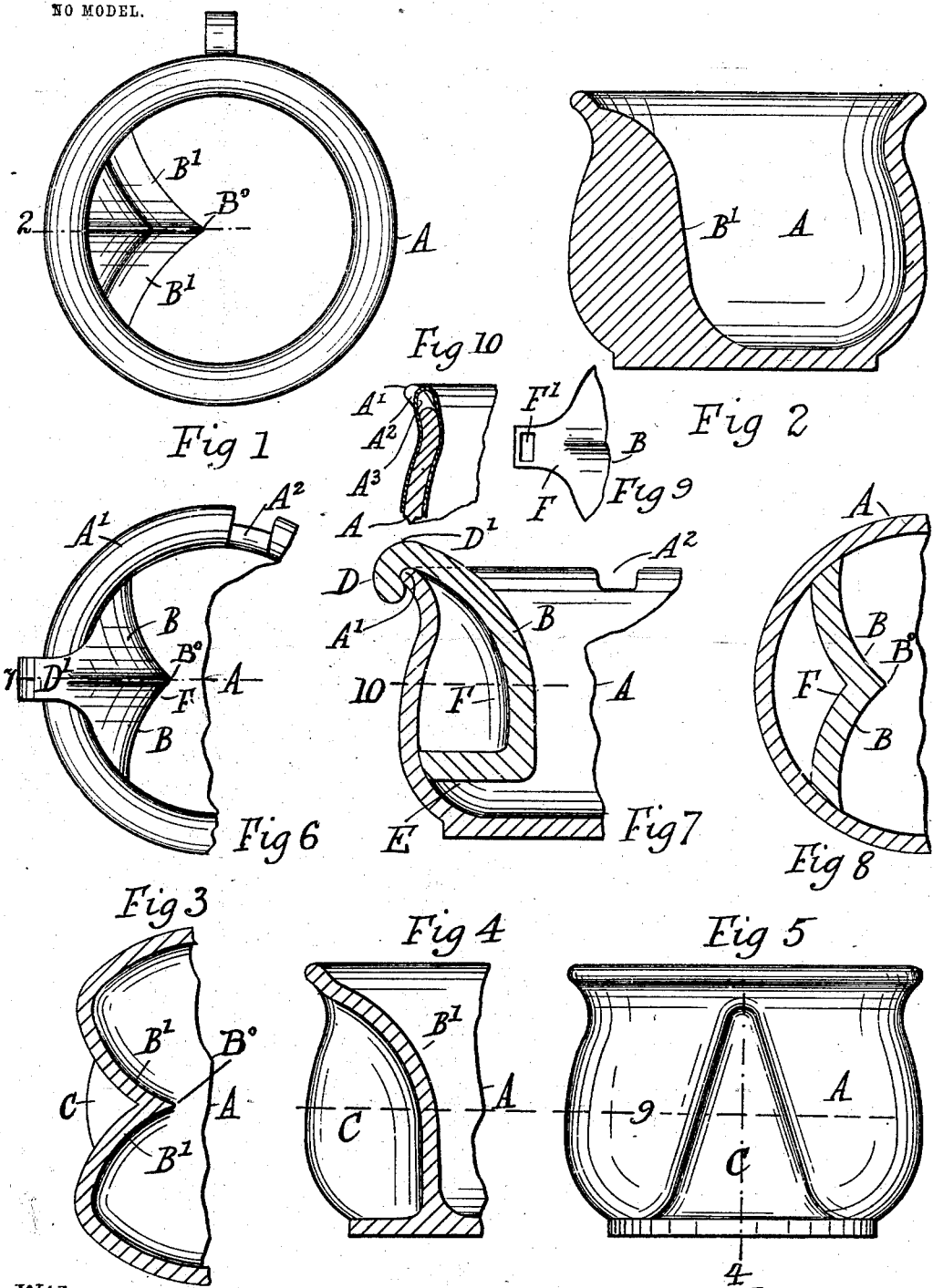

PERCY HERBERT DANDO, OF WHANGAREI, NEW ZEALAND.

CHAMBER UTENSIL AND ATTACHMENT THEREFOR.

SPECIFICATION forming part of Letters Patent No. 717,972, dated January 6, 1903.

Application filed September 2, 1902. Serial No. 121,882. (No model.)

*To all whom it may concern:*

Be it known that I, PERCY HERBERT DANDO, a subject of the King of Great Britain and Ireland, residing at Whangarei, in the Colony of New Zealand, have invented certain new and useful Improvements in Chamber Utensils and Attachments Therefor; and I do hereby declare the following to be a full, clear, and exact description of the invention, such as will enable others skilled in the art to which it appertains to make and use the same.

The object of this invention is to provide improvements by which what is known as a "chamber utensil" (hereinafter called the "vessel" or "utensil") may be used noiselessly. To this end are provided special interior surfaces adapted to receive the impact of fluid and avoid the striking of fluid upon fluid, which is what causes the objectionable sound. The surfaces provided are part of a special adjustable or removable attachment hinged, pivoted, or otherwise attached to the utensil. As a modification they may be integral with the vessel and be of any appropriate contour, size, and material. I avoid in my invention having said integral part raised or projecting in the middle of the vessel, my special surfaces being at or located on one side of said middle, whereby the vessel may be made use of without interfering with its general utility.

Referring to the accompanying drawings, illustrating my invention, Figure 1 is a plan view of a chamber with my invention applied thereto. Fig. 2 is a vertical section on the line 2 of Fig. 1. Fig. 3 is a fragmentary view, in horizontal section, through chamber and attachment on line 9, Figs. 4 and 5. Fig. 4 is a fragmentary vertical section on line 4, Fig. 5. Fig. 5 is an elevation showing an exterior view of a modified form of the invention illustrated in Figs. 1 and 2. Fig. 6 is a plan view of another modified form, showing a detachable or non-integral arrangement of my invention. Fig. 7 is a fragmentary vertical section on the line 7 of Fig. 6. Fig. 8 is a horizontal section on line 10 of Fig. 7, and Figs. 9 and 10 show detail views of a modified means of securing the non-integral attachment shown in Figs. 6 to 8 to the chamber's rim.

A represents the chamber or vessel.

B represents the side surfaces of the downwardly-projecting removable attachment F, while B' represents similar surfaces formed continuous with the chamber's wall when my improvement is formed integral therewith. In both constructions I prefer to form these side surfaces B B' concave, converging in a common central longitudinally-curved ridge $B^0$, so that the inner walls of said attachment present a longitudinally-curved surface of a substantial oppositely-disposed concave configuration in horizontal section. Part of the vessel may (in the course of manufacture) be pushed inward or otherwise treated with like effect, so as while economizing the material to leave an external hollow C, Figs. 3 to 5.

D, Figs. 6 and 7, is a lip which may be located in a recess $A^2$ in rim A' of vessel A, in which case the lip is prevented from slipping around the rim, while the top D' of the said lip will be about flush with or below the level of rim A', or the lip D may rest on rim A', as illustrated, said rim forming a support to the attachment, block, or sheet of material F, or the support may be arranged in any equivalent manner.

E is a lateral or oblique extension forming the lower edge of the removable attachment and located clear above the base of vessel A to restrict the room within the vessel less, or the attachment may extend to the said base in some cases.

In cases where the attachment F is connected to the vessel A by a hinge or pivot, it may be easily swung over to rest in a position within or without the vessel, enabling the latter to be used either way, as preferred, at any time and to be conveniently cleansed. For this effect a clip $A^3$ is shown in Fig. 10 and is adapted to pass through a slot F' in the top part of block F, Fig. 9, or other known pivotal or hinge device may be employed with or without a rim depression, as at $A^2$.

What I claim as my invention, and desire to secure by Letters Patent of the United States, is—

1. The article of manufacture consisting of a chamber having, for the purpose set forth, a projection from the interior of one side formed as a ridge with sides that slope downwardly and transversely, said sides joining the ridge with the interior wall of the chamber.

2. The article of manufacture consisting of a chamber having, for the purpose set forth, a projection from the interior of one side formed as a ridge with sides that are downwardly curved and of concave conformation in cross-section, said sides joining the ridge with the interior wall of the chamber.

3. The combination with a chamber, of means, for the purpose set forth, comprising a downwardly-projecting detachable side attachment provided with downwardly and transversely sloping side walls.

4. The combination with a chamber, of means, for the purpose set forth, comprising a downwardly-projecting detachable side attachment provided with a central longitudinal rib and concave side walls.

5. The combination with a chamber having a slot in the rim thereof, of means, for the purpose set forth, comprising a downwardly-projecting detachable side attachment provided with a curved hook at the upper end thereof adapted to rest in said slot and engage the rim of said chamber for supporting the same thereon flush with the top.

6. The combination with a chamber having a slot in the rim thereof, of means, for the purpose set forth, comprising a downwardly-projecting detachable side attachment provided with a projection or lip at the upper end thereof adapted to engage said slot, and means for securing said projection or lip in said slot flush with the surface of said chamber's rim.

7. The combination with a chamber having a slot in the rim thereof, of means, for the purpose set forth, comprising a downwardly-projecting detachable side attachment provided with a curved hook at the upper end thereof adapted to rest in said slot and engage the rim of said chamber for supporting the same thereon flush with the top, said attachment having downwardly and transversely sloping side walls.

8. The combination with a chamber having a slot in the rim thereof, of means, for the purpose set forth, comprising a downwardly-projecting detachable side attachment provided with a curved hook at the upper end thereof adapted to rest in said slot and engage the rim of said chamber for supporting the same thereon flush with the top, said attachment having a curved central longitudinal rib and concave side walls.

In testimony whereof I affix my signature in presence of witnesses.

PERCY HERBERT DANDO.

Witnesses:
GEORGE A. BROADBENT,
PERCY W. MOORE,
A. R. CRANE.